United States Patent [19]

Leiber et al.

[11] Patent Number: 4,984,649

[45] Date of Patent: Jan. 15, 1991

[54] MOTOR VEHICLE WITH AN AUTOMATIC LIMITED-SLIP DIFFERENTIAL

[75] Inventors: Heinz Leiber, Oberriexingen; Hans Ohnemüller, Reutlingen; Klaus Kastner, Stuttgart; Karl-Heinz Richter, Kernen, all of Fed. Rep. of Germany

[73] Assignee: Mercedes-Benz AG, Fed. Rep. of Germany

[21] Appl. No.: 409,001

[22] Filed: Sep. 18, 1989

[30] Foreign Application Priority Data

Sep. 17, 1988 [DE] Fed. Rep. of Germany ....... 3831690

[51] Int. Cl.$^5$ .............................................. B60K 17/34
[52] U.S. Cl. .................................... 180/197; 180/249; 364/424.1
[58] Field of Search ................... 180/197, 76, 248, 249; 364/424.1

[56] References Cited

U.S. PATENT DOCUMENTS

| 4,700,797 | 10/1987 | Leiber ................................... 180/197 |
| 4,745,987 | 5/1988 | Buschmann ........................ 180/197 |
| 4,779,202 | 10/1988 | Leiber ............................. 180/197 X |
| 4,840,389 | 6/1989 | Kawabe et al. ................. 180/140 X |
| 4,874,059 | 10/1989 | Kasegawa ....................... 180/197 X |

FOREIGN PATENT DOCUMENTS

| 3342574 | 6/1985 | Fed. Rep. of Germany . |
| 3430982 | 3/1986 | Fed. Rep. of Germany . |
| 3528389 | 2/1987 | Fed. Rep. of Germany . |
| 41283 | 2/1988 | Japan .................................. 180/140 |

OTHER PUBLICATIONS

DE-7 Mot Nr. 12/86 v. 31.5.86, 5. 104–111.

*Primary Examiner*—Charles A. Marmor
*Assistant Examiner*—Alan M. Kagen
*Attorney, Agent, or Firm*—Evenson, Wands, Edwards, Lenahan & McKeown

[57] ABSTRACT

The subject-matter is a motor vehicle having a drive system which acts on the wheels of an axle via an automatic limited-slip differential (ASD) in dependence on the driving speed and on the slip of the driving wheels, rotational-speed sensors being provided for each vehicle wheel and a control logic circuit being provided which processes the signals of the rotational-speed sensors and other signals to form control signals for connecting and disconnecting the limited-slip differential, taking into consideration the driving-dynamic aspects in the respective driving condition, the limited-slip differential being combined with a wheel slip control (ASR) which exclusively acts on the drive torque of the vehicle engine in order to ensure a high measure of traction and driving stability overall with low expenditure.

6 Claims, 2 Drawing Sheets

MOTOR VEHICLE WITH AN AUTOMATIC LIMITED-SLIP DIFFERENTIAL

BACKGROUND AND SUMMARY OF THE INVENTION

The invention generally relates to a motor vehicle and more particularly to a control arrangement for a vehicle having both a slip limiting differential and an engine equipped with a wheel sliP control.

Such a generic motor vehicle is known from the German Journal; mot No. 12/86 of 31.5.86, pages 104–111, particularly pages 109 and 111. Since there is no intervention of the engine forces in this model, the wheels can spin with an appropriately high drive torque of the engine and thus both traction losses and significant lateral force losses can occur.

It is thus an object of the present invention to provide a generic drive system in such a manner that a high measure of traction and driving stability is ensured with low expenditure.

The invention achieves, in particular, advantages that by combining an automatic slip limiting differential (ASD) with an engine wheel slip control system (ASR), the known disadvantages with respect to traction and also lateral stability are avoided, the ASD can be switched accurately taking into consideration driving dynamic aspects, and only a low expenditure is required for the ASR since intervention in the brakes is omitted.

Other objects, advantages and novel features of the present invention will become apparent from the following detailed description of the invention when considered in conjunction with the accompanying drawings.

DETAILED DESCRIPTION OF THE DRAWINGS

Figure 1:
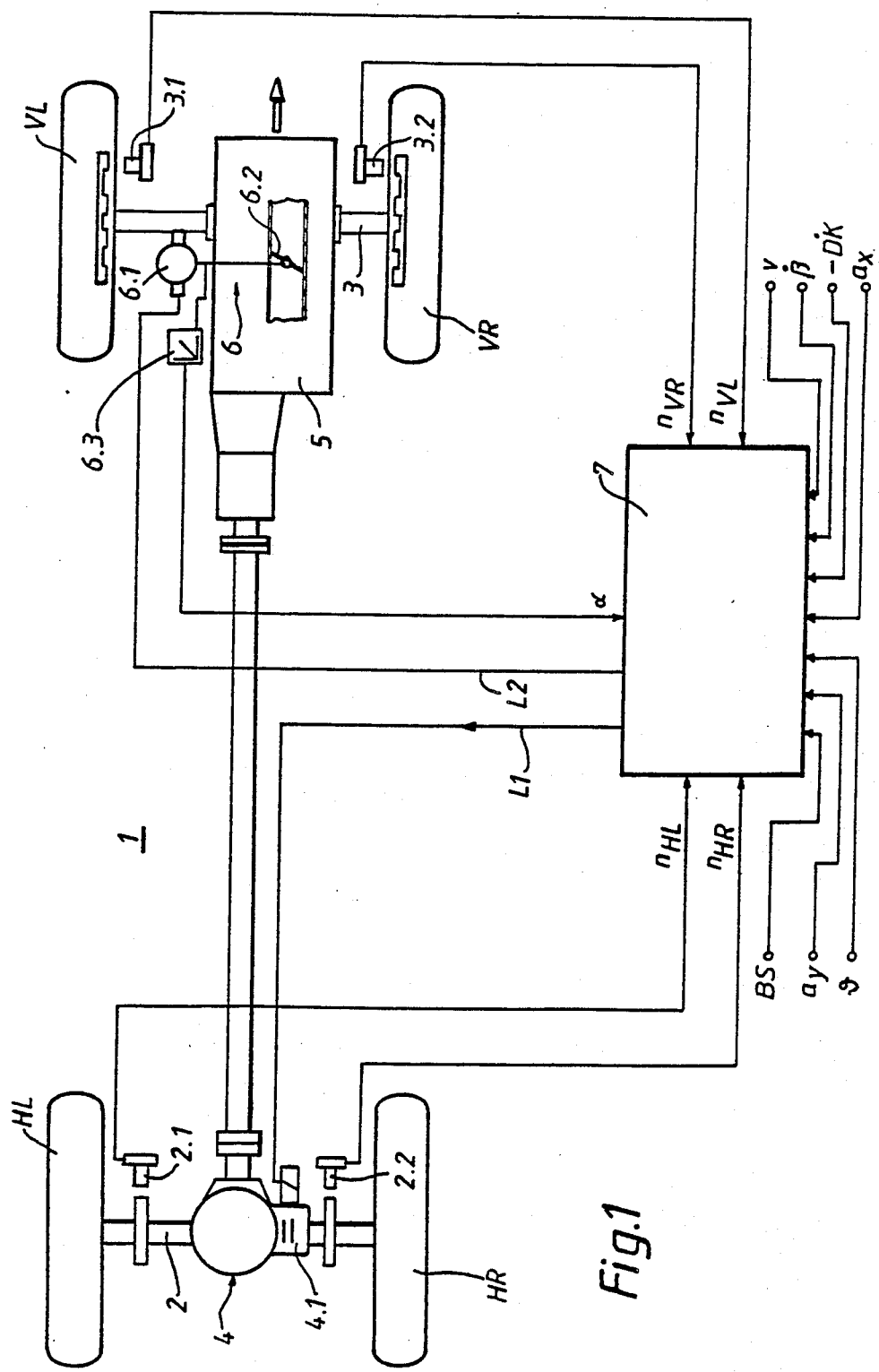
FIG. 1 shows a diagrammatic representation of a system diagram of the vehicle.

A vehicle 1 shown in FIG. 1 has a rear axle 2 and a front axle 3. Further, rotational-speed sensors are arranged both at an output of an automatic limited-slip differential (ASD) 4 and at the front axle 3, rotational-speed sensors 2.1 being associated with wheel HL, sensor 2.2 with wheel HR, sensor 3.1 with the non-driven wheel VL and sensor 3.2 with the non-driven wheel VR. An engine 5 of the vehicle 1 has a control device 6 for limiting drive torque, the control device 6 being, for example, an actuator 6.1 for adjusting the throttle flap 6.2 and having a position transmitter 6.3 for the throttle flap position.

Output signals $n_{VL}$, $n_{VR}$, $n_{HL}$, $n_{HR}$ of the wheel rotational-speed sensors 3.1, 3.2, 2.1, 2.2 and output signal $\alpha$ of the position transmitter 6.3 are supplied to an electronic control logic circuit 7 which also includes outputs for a braking signal BS, a lateral acceleration signal $a_y$, a steering angle signal $\theta$, a sideslip angle velocity signal $\beta$, a gas pedal signal - DK, a longitudinal acceleration signal $a_x$ and a vehicle speed signal v. Furthermore, the control logic circuit 7 is also connected, via a switching line L1, to the electrically switchable lateral lock 4.1 of the limited-slip differential 4 and to the actuator 6.1 via a switching line L2.

Figure 2:
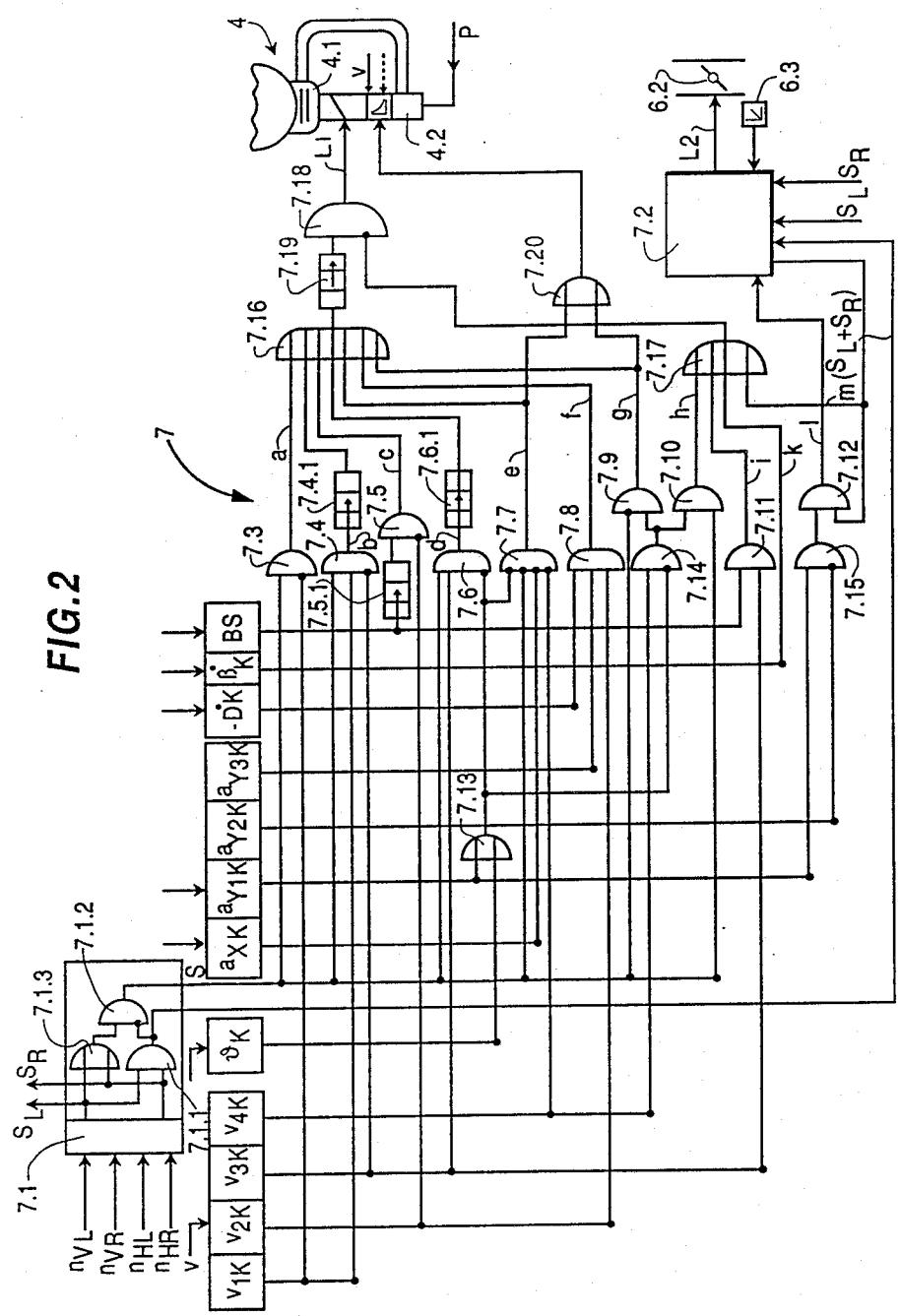
FIG. 2 shows a block diagram of the control logic circuit.

The most important logic functions and their sequences are shown in the block diagram of the control logic circuit 7 provided by FIG. 2. In a comparator circuit 7.1, the rotational-speed signals provided by the rotational-speed 2.1, 2.2, 3.1, 3.2 are processed into velocity signals and compared side by side so that slip signals $S_L$, $S_R$ are provided at an output of the comparator circuit 7.1 when there is a deviation. These slip signals $S_L$, $S_R$ are supplied both to an AND gate 7.1.1, an output of which is connected, to a drive slip control system 7.2 (ASR). Slip signals $S_L$, $S_p$ are also supplied from the comparator circuit 7.1 to an OR gate 7.1.3, an output of which is connected to a further input of the AND gate 7.1.2 so that a signal s is then present at the output of the AND gate 7.1.2 if slip occurs unilaterally on the left or on the right.

Furthermore, the vehicle speed signal v is supplied to four threshold value comparators $v_{1k}$ to $v_{4k}$. The steering angle signal $\theta$ is supplied to a threshold value comparator $\theta_K$. The longitudinal acceleration signal $a_x$ is supplied to a threshold value comparator $a_{xk}$. The lateral acceleration signal $a_y$ is supplied to three threshold value comparators $a_{y1k}$ to $a_{y3k}$. The sideslip angle velocity signal $\beta$ is supplied to a threshold value comparator $\beta_k$ and the accelerator release signal - DK and the braking signal BS are directly supplied to the circuit 7.

Taking into consideration driving-dynamic aspects, outputs of the individual components previously mentioned are then, as shown in FIG. 2, connected to various logic elements 7.3 to 7.15 so that a signal appears at outputs of AND gates 7.3 to 7.12 when the following conditions exist:

signal a at AND gate 7.3:
signal s, that is to say unilateral slip on the left or right and
vehicle speed v has not exceeded the threshold of a first threshold value comparator $v_{1k}$, that is to say $v < v_1$, the threshold $v_1$ being about 10 km/h;

signal b at AND gate 7.4:
signal s
and vehicle speed v has exceeded the threshold of the first threshold value comparator $v_{1K}$
and not exceeded the threshold of the third threshold value comparator $v_{3k}$, that is to say $v_1 < v < v_3$, the threshold $v_3$ being about 60 KM/H;
since the signal b is conducted via a timing element 7.4.1 (having a time delay of about 200 ms), it is only forwarded with a corresponding time delay after having been generated;

signal c at AND gate 7.5:
Braking signal BS (brake operated and braking switch closed) and
vehicle speed v has not exceeded the threshold of the second threshold value comparator $v_{2k}$, that is to say $v < v_2$,
since the braking signal BS is conducted via a timing element 7.5.1 (having a time delay of about 200 ms), the signal c is also generated only with a corresponding time delay;

signal d at AND gate 7.6:
signal s and
vehicle speed v has exceeded the threshold of the third threshold value comparator $v_{3K}$, that is to say $v > v_3$, and
no signal of the OR gate 7.13, which means: the steering angle $\theta$ has not exceeded the threshold of the steering angle comparator $\theta_k$ or the lateral acceleration $a_y$ has not exceeded the threshold of the first threshold value comparator $a_{y1k}$, that is to say $a_y < a_{y1}$, the threshold $\theta_k$ being about 30° and the threshold $a_{y1}$ being about 0.1 g;

since signal d is conducted via a timing element 7.6.1, it is only forwarded with a corresponding time delay after having been generated;

signal e at AND gate 7.7:
no signal s and
vehicle speed v has not exceeded the threshold of the fourth threshold value comparator $v_{4K}$, that is to say $v < v_4$, the threshold $v_4$ being about 80 km/h, and
the longitudinal acceleration $a_x$ has not exceeded the threshold of threshold value comparator $a_{xK}$, the threshold $a_x$ being about 0.2 g and
no signal of the OR gate 7.13;

signal f at AND gate 7.8:
gas pedal signal - DK
(accelerator release at the gas pedal or throttle flap restoration - $\Delta\alpha$) and
vehicle speed v has exceeded the threshold of the second threshold value comparator $v_{2K}$, that is to say $v > v_2$, and
the lateral acceleration $a_y$ has exceeded the threshold of the third threshold value comparator $a_{y3k}$, that is to say $a_y > a_{y3}$, the threshold $a_{y3}$ being about 0.5 g;

signal g at AND gate 7.9:
no signal s and
a signal of the AND gate 7.14 which means: the vehicle speed v has exceeded the threshold of the fourth threshold value comparator $v_{4k}$, that is to say $v > v_4$, and
no signal of the OR gate 7.13;

signal h at AND gate 7.10:
signal s and
a signal of the AND gate 7.14;

signal i at AND gate 7.11:
braking signal BS and
vehicle speed v has exceeded the threshold of the third threshold value comparator $v_{3k}$, that is to say $v > v_3$;

signal k:
the sideslip angle velocity $\beta$ has exceeded the threshold of the sideslip angle velocity comparator $\beta_k$, the threshold $\beta_k$ being about 10°; (the tangent of the sideslip angle $\beta$ is equal to the ratio between lateral velocity $v_y$ and longitudinal velocity $v_x$);

signal l at AND gate 7.12:
a signal of the AND gate 7.15 which means: the lateral acceleration $a_y$ has exceeded the threshold of the first ($a_{y1k}$) and not exceeded the threshold of the second ($a_{y2k}$), that is to say $a_{y1} < a_y < a_{y2}$, the threshold $a_{y2}$ being about 0.3 g, and
a signal m.

The signal m is directly generated by the wheel slip control system 7.2 during a first control cycle of an ASR control process.

The signals a to g are inputted to an OR gate 7.16 and signals h to k and m are inputted to an OR gate 7.17 whilst the signal l is supplied to the $ASR$ 7.2 as an input signal.

In this arrangement, the output of OR gate 7.17 is connected to an inverting input of an AND gate 7.18, the other input of which is connected via a timing element 7.19, having a time delay of about 200 ms, to an output of the OR gate 7.16.

Whilst signals a to g cause the lateral lock 4.1 of the ASD 4 to be connected if none of signals h to k and m are present at AND gate 7.18, the latter condition causes a disconnection of the ASD 4. If one of the signals a to g, which signal caused the connection to be effected, should disappear again, the lateral lock 4.1 is also disconnected again but with a time delay due to the timing element 7.19.

Due to the connection and disconnection of the lateral lock 4.1 of the ASD 4 by means of the individual signals, the following driving dynamic aspects are here taken into account in the respective driving condition:

Signal a: Improvement of traction during start-up;
Signal b: Improvement of driving stability;
Signal c: Shortening of the braking distance;
Signal d: Improvement of traction in straight ahead driving;
Signal e: Improvement of traction and driving stability on roadways having a low coefficient of friction;
Signal f: Reduction of the yawing reaction and over steering of the vehicle;
Signal g: Improvement of straight ahead running and of cross wind sensitivity;
Signal h: Improvement of stability on a slippery or unilaterally slippery roadway;
Signal i: Improvement of braking stability with conditions of adhesive friction of the roadway which are different from side to side ($\mu$ split conditions);
Signal k: Improvement of driving stability;
Signal m: Improvement of lateral stability; since, as a rule, both drive wheels exhibit slip when the ASR control is applied, signal m prevents connection or causes disconnection of the ASD; signal m is no longer present when the first control cycle of the ASR is completed;
Signal l: which is dependent on signal m and is supplied to the ASR, has the effect that in the lateral acceleration conditions mentioned, the slipping thresholds for the response of the ASR are reduced which results in an improvement of lateral stability.

Thus, it can be seen that both the ASR and the ASD can be oPerating simultaneously and also independently of one another. Simultaneity can exist, for example, under the conditions leading to signal e: wherein, although there is no unilateral slip but $a_x$ is very small, the ASR recognizes on the basis of the slip signals supplied to it that slip must then be present on both sides and connects. At the same time, it uses signal m to block the connection of the ASD during the first control cycle but releases the connection after the first control cycle has run its course. Furthermore, the ASR can then disconnect again even though the ASD can remain connected if the conditions for signal e are still present.

As can also be seen from FIG. 2, the ASD 4 could also be constructed with a variable lateral lock 4.1, in which arrangement a pressure control valve 4.2 having a pre-determinable control characteristic is supplied, at least with the signals e and g via an OR gate 7.20 and, with at least the vehicle speed signal v, so that from a certain speed and with a positive speed change ($+v$) the control pressure for the lateral lock is reduced and the initial locking torque of 100% is reduced in steps or continuously to lower values ($x\%$). The ASD would then be preferably constructed electro-hydraulically.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. In combination with a motor vehicle having a vehicle engine of a drive system which acts on vehicle wheel of an axle via an automatic slip limiting differential means in dependence on a driving speed of the vehicle and slip of drive wheels, the slip limiting differential means including rotational speed sensor means for sensing a rotational speed of each vehicle wheel and a control logic circuit means for generating control signals for connecting and disconnecting the slip limiting differential means, a wheel slip control means for acting exclusively on a drive torque of the vehicle engine in dependence on the slip of the wheels, the control logic circuit means operating in response to threshold signals generated by several different threshold value comparator means and signal transmitter means, the combination further comprising:

means for generating a control signal a when slip of the vehicle wheels occurs unilaterally and the vehicle speed is less than a first speed threshold value;

means for generating a control signal b when slip of the vehicle wheels occurs unilaterally and the vehicle speed is greater than the first speed threshold value and less than a third speed threshold value greater than the first speed threshold value;

means for generating a control signal c when a braking signal is generated by one of the signal transmitter means and the vehicle speed is below a second speed threshold value;

means for generating a control signal d when slip of the vehicle wheels occurs unilaterallY, the vehicle speed is greater than the third speed threshold value greater than the second speed threshold value and a predetermined value of one of a steering angle threshold and a first lateral acceleration threshold has not been exceeded.

means for generating a control signal e when no unilateral slip of the vehicle wheels occurs, the vehicle speed is less than a fourth speed threshold value greater than the third speed threshold value, a predetermined threshold of a longitudinal acceleration threshold has not been exceeded, and at least one of the steering angle threshold, and the first lateral acceleration threshold has not been exceeded;

means for generating a control signal f when one of the signal transmitters generates an accelerator release signal the vehicle speed is greater than the second speed threshold value and a third lateral acceleration threshold greater than the first lateral acceleration threshold has been exceeded;

means for generating a control signal g when there is no unilateral slip of the vehicle wheels, the vehicle speed is greater than the fourth speed threshold value, and the predetermined threshold of one of the steering angle threshold and the first lateral acceleration threshold has not been exceeded;

means for generating a control signal h when slip of the vehicle wheels occurs unilaterally and the vehicle speed is greater than the fourth speed threshold value and the predetermined threshold of one of the steering angle threshold and the first lateral acceleration threshold has not been exceeded;

means for generating a control signal i when a braking signal is generated by one of the signal transmitter means and the vehicle speed is greater than the third speed threshold value;

means for generating a control signal k when a predetermined threshold value of a sideslip angle velocity threshold has been exceeded;

means for generating a control signal 1 when the first lateral acceleration threshold has been exceeded and a second lateral acceleration threshold greater than the first lateral acceleration threshold has not been exceeded during a first control cycle of the wheel slip control means;

means for generating a control signal m when the wheel slip control means;

means for connecting the slip limiting differential means without delay when at least one control signal a, e, f, and g is generated;

means for connecting the slip limiting differential means with delay when at least one control signal b, c and d is generated;

means for disconnecting the slip limiting differential means with a time delay after at least one control signal a, b, c, d, e, f, and g is generated and removed;

means for disconnecting the slip limiting differential means without delay when at least one control signal h, i, k, and m is generated; and means for reducing a slip threshold of the wheel slip control means if the control signal 1 is generated.

2. Motor vehicle according to claim 1, wherein the control logic circuit means includes a comparator circuit means for generating slip signals from the signals of the wheel rotational speed sensor means.

3. Motor vehicle according to claim 1, wherein the engine has a control means, which is activated by the wheel slip control means, for limiting the drive torque.

4. Motor vehicle according to claim 1, wherein a connection of the slip limiting differential means is prevented and a connected slip limiting differential means is disconnected without delay during the first control cycle of the wheel slip control means.

5. Motor vehicle according to claim 1, wherein a lateral locking means of the slip limiting differential means can be switched between either of two modes.

6. Motor vehicle according to claim 1, wherein a lateral lock of the slip limiting differential means can be switched with variable locking torque.

* * * * *